United States Patent [19]

Cavender

[11] Patent Number: 5,772,936
[45] Date of Patent: Jun. 30, 1998

[54] METHOD OF REDUCING PINCH DEFORMATION AND CONTOUR LINES IN POLYURETHANE MOLDED FOAM EMPLOYING TIMED PARTIAL PRESSURE RELEASE

[75] Inventor: Keith Douglas Cavender, Charleston, W. Va.

[73] Assignee: ARCO Chemical Technology, L.P., Greenville, Del.

[21] Appl. No.: 385,409

[22] Filed: Feb. 8, 1995

[51] Int. Cl.[6] .................................................. B29C 44/02
[52] U.S. Cl. .................................. 264/51; 264/53; 264/54
[58] Field of Search ........................... 264/40.3, 51, 53, 264/DIG. 13, 54

[56] References Cited

U.S. PATENT DOCUMENTS

| | | | |
|---|---|---|---|
| 3,919,445 | 11/1975 | Smarook | 425/812 |
| 4,579,700 | 4/1986 | Cavender | 264/46.4 |
| 4,693,448 | 9/1987 | Proksa et al. | 425/406 |
| 4,717,518 | 1/1988 | Cavender | 264/51 |
| 4,923,653 | 5/1990 | Matsuura et al. | 264/40.3 |
| 4,959,184 | 9/1990 | Akai et al. | 264/40.3 |
| 4,976,414 | 12/1990 | Yanagishita | 264/40.3 |
| 5,182,313 | 1/1993 | Carson | 249/66.1 |
| 5,248,703 | 9/1993 | Krueger et al. | 521/125 |

FOREIGN PATENT DOCUMENTS

61-40115  2/1986  Japan ........................ 264/53

*Primary Examiner*—Allan R Kuhns
*Attorney, Agent, or Firm*—Dennis M. Kozak

[57] ABSTRACT

An improved process for cell opening of cellular polyurethane molded foam using timed partial pressure release (TPPR) reduces pinch deformation and contour lines by releasing the internal mold pressure in a curing cellular molded polyurethane foam product in a controlled manner which allows gas to escape from the mold, but which prohibits relative movement of the mold sealing surfaces by more than an imperceptible amount.

19 Claims, 2 Drawing Sheets

METHOD OF REDUCING PINCH DEFORMATION AND CONTOUR LINES IN POLYURETHANE MOLDED FOAM EMPLOYING TIMED PARTIAL PRESSURE RELEASE

TECHNICAL FIELD

The subject invention pertains to a method for reducing pinching and contour lines in polyurethane molded foam. More particularly, the subject invention pertains to a process for reducing pinches and contour lines in polyurethane molded foam utilizing timed pressure release as a cell opening technique, in which the mold closing pressure is reduced but not released, thus providing a cell opening effect while minimizing movement of the mold per se.

BACKGROUND ART

The largest two commercial categories of polyurethane foam are molded polyurethane foam and slab stock polyurethane foam. In the latter, the polyurethane foam-forming reactants are deposited on a moving conveyor and allowed to expand to their full extent. The resulting foam, due to the formulation, and the ability of the foam to expand unrestrained, produces a relatively open-celled foam which may then be sliced into forms suitable for seating cushions, mattresses, carpet underlay, and other uses.

In the case of molded foam, however, the foam is not allowed to rise unrestrained, but rises only to fill the contours of the mold. Under such conditions, rather than an open celled foam being formed, a predominantly closed celled foam is formed. The molded foam is allowed to cure in the mold to the extent that it may be removed from the mold and handled without tearing. To provide a full cure, the molded foam may be passed through an oven maintained at a suitably elevated temperature for a time period sufficient to cure the foam, or may be post-cured at ambient temperature over a longer period.

Due to the heat of reaction evolved when such foams are prepared, the cells of molded foams initially contain gas at elevated temperature. When the molded foam product is allowed to cool, the reduction in pressure of the gas in the cells due to the decrease in temperature causes the foam to shrink, producing a product which is generally not useable. To counteract such shrinkage, prior techniques required crushing the foam, either by rollers, by hand, or by other mechanical means, immediately after removal from the mold. Crushing at this stage, while the polymer system has not fully cross-linked, ruptures a great many of the cell walls, thus producing a foam which has both closed cells as well as a large number of open cells. In addition to the open cells preventing further shrinkage, the number of open cells contributes to the resiliency of the foam.

Hand crushing or roller crushing of molded foam, however, is unsatisfactory in several ways. Hand crushing is time and labor intensive, and may produce a product which is not uniform in texture due to the inability to crush the foam uniformly across its entire extent. Roller crushing, while offering reductions in the amount of time utilized to crush the foam, and an improvement in the consistency of the foam, is inapplicable to many molded articles which contain frame members or other rigid parts molded into the foam, as is often the case with automobile seat cushions, for example.

In U.S. Pat. No. 4,579,700, which is herein incorporated by reference, a cell opening technique is disclosed which substantially avoids the use of hand or roller crushing. In the process disclosed in the '700 patent, cell opening is achieved by the simple, yet elegant process of releasing the pressure on the mold during a specific time period during the cure of the polyurethane system at which time the polyurethane has developed enough strength to avoid collapse, yet does not have sufficient strength to prevent bursting of walls as the pressure in the mold is released. This technique, entitled "Timed Pressure Release," or "TPR," involves the total release of pressure from the mold, for example by releasing the clamps which secure the mold, during a narrow processing window. This processing window, commonly referred to as the "TPR window" varies with each particular polyurethane system, as well as processing parameters such as mold temperature and pressure. However, for a given polyurethane system and set of operating parameters, the TPR window may be determined by monitoring the shrinkage of foams produced by opening the mold at various times after the introduction of the polyurethane reactants.

In U.S. Pat. No. 4,717,518, is disclosed a combination of mold pressure release with conventional crushing wherein the total amount of crushing force required to produce the necessary cell opening is reduced. In the '518 patent, rather than open the mold during the TPR window, the mold is opened at a period shortly after the TPR window but before the polyurethane foam has developed enough strength to totally resist cell opening by pressure release. Under these conditions, a nominal amount of cell opening is produced, the remainder of the required cell opening being performed by crushing. A reduction in the crushing force of from 20% to about 80% is achieved by this process. However, as indicated, the process still does require hand crushing, roller crushing, or other crushing measures.

The '518 system is particularly useful for rapid demold systems, i.e. those which demold shortly after the pour time, for example, 3.5 minutes or thereabouts. For such short demold foams, the TPR window is quite narrow, and thus the normal system and processing parameter variations render cell opening by the unmodified TPR technique somewhat problematic. Moreover, as the pressure release after the TPR window does produce some cell opening effect, further crushing of the foam by hand or roller techniques produces a more uniform foam than would be produced if only hand crushing or roller crushing were utilized. Both the '700 and '518 patents have been extensively licensed, and are utilized throughout the world.

The processes disclosed in the '700 and '518 patents are not without their limitations and drawbacks, however. In particular, in the TPR technique in which the polyurethane foam has achieved only partial strength, the sudden release of mold closing pressure, in conjunction with the internal pressure developed by the foaming polyurethane system, forces the mold apart at the sealing surfaces. As the polyurethane system is only partially cured, "pinches" often occur at the time of pressure release, when the "green" or non-optimally cured foam expands into the opening created at the mold parting line. In addition, further distortions termed "contour lines" may occur across the surface of the part, these contour lines being attributed to a differential release of the part from the cavity versus the lid of the mold. Contour lines are believed to be formed when a portion of the molded part remains bonded to the lid of the mold and therefore pulls away from the cavity, while another portion remains bonded to the cavity and pulls away from the lid. This distortion is normally less severe in consequence than pinch deformation, which generally results in a scrapped part. In both cases, excessive or uncontrolled separation of the lid and cavity of the mold at TPR is responsible and, in both cases, the resulting deformations are permanently locked into the part by the subsequent curing that occurs between time of pressure release and time of demold.

Historic approaches aimed at correction of these distortion problems have been only partially successful. For air bag clamped tools, restrained cavity drops via shimming or adjustable stops has shown some success; however, when the cavity drop is limited adequately to eliminate the above-described distortions, lid-to-cavity interference problems may result at either mold closure or mold opening prior to demold.

Another technique has been employed with even less success, this technique to control the air bag deflate/reinflate interval, i.e. start reinflation before the cavity has dropped far enough to cause the distortion problem. This process has been found to be extremely difficult to control and to be variable from tool to tool. The use of mechanical lid restraints and very critical application of mold release agents are approaches which have also been employed with limited success, but again control under actual line conditions in a plant environment can be very difficult.

OBJECTS OF THE INVENTION

It is an object of the invention to substantially reduce or eliminate pinch deformation in the production of polyurethane molded foam using timed pressure release.

It is a further object of the invention to reduce or substantially eliminate contour lines during production of polyurethane molded foam using timed pressure release.

SUMMARY OF THE INVENTION

The present invention pertains to a process for reducing or substantially eliminating pinches and contour lines in the production of polyurethane molded foam by employing a timed pressure release process for cell opening, in which the mold clamping pressure is not eliminated, but is merely reduced such that the mold parts along the parting lines by an imperceptible amount which is sufficient to release pressure on the polyurethane molded foam to cause cell opening, yet which is not sufficient to allow the green foam to escape into the area between the part lines, or to produce enough movement in the mold cavity to cause differential adhesion to the cavity or mold surface.

In the subject process, the lowered pressure in the mold resulting from the release of gas is sufficient to allow the mold to reseal without resorting to increasing the mold sealing force by external means.

DESCRIPTION OF THE PREFERRED EMBODIMENTS

The subject invention process may be termed Timed Partial Pressure Release or TPPR to distinguish it from the TPR process as practiced by the prior art.

Polyurethane molded foams are produced by introducing reactive polyurethane forming ingredients into a closed mold or into an open mold which is subsequently closed. The polyurethane ingredients include, in a general sense, one or more polyisocyanates, one or more polyisocyanate reactive ingredients, a reactive, non-reactive, or combination of reactive and non-reactive blowing agents, a urethane reaction promoting catalyst, and a suitable surfactant. The reactive polyurethane-forming ingredients are thoroughly mixed prior to entering the mold, and react to form polyurethane in situ. In the case where a non-reactive blowing agent is utilized, the heat of the exothermic polyurethane reaction is sufficient to volatilize the blowing agent, thus forming a foam which then expands to fill the mold. In the case of reactive blowing agents, such as water, the water reacts with the isocyanate to liberate carbon dioxide and form an organic amine. The liberated carbon dioxide causes the reacting polyurethane system to foam, while the amine reacts with additional isocyanate to form urea linkages such that the finished foam contains both polyurethane and polyurea groups.

Foam characteristics such as resiliency, density, ILD and other physical parameters are adjusted both by changing the nature of the reactive ingredients, as well as by changing the amount of blowing agent and the amount of the reactive polyurethane system injected into the mold.

As an illustration, the foamable reaction mixture is conveniently prepared by mixing a preblend of all ingredients except the polyisocyanate and thereafter mixing the preblend with the polyisocyanate and quickly introducing the resulting mixture into the mold. The preblend generally contains a polyol which may comprise a polymer modified polyol or a mixture of polyol and polymer modified polyol; water; one or more catalysts; and one or more surfactants, in addition to any other additives such as pigments, chain extenders, cross linkers, or special effects additives. Since none of these ingredients in the preblend interreact with each other the preblend may be formed well in advance of mixing with the polyisocyanate. However, once the water-containing polyol blend is contacted with the polyisocyanate the polyurethane-forming and $CO_2$-forming reactions begin. When fluorocarbons, hydrofluorocarbons, perfluorocarbons, alkanes, cycloalkanes, or other volatile blowing agents are used, these may be added in the mixhead, or may be dissolved in the isocyanate or polyol mixture.

As indicated previously, molded polyurethane foams are prepared by the reaction of an isocyanate component and an isocyanate-reactive component. The isocyanate-reactive components generally have an average functionality greater than two. Numerous reactive functionalities may be used to prepare polyurethane products, as this term is generally understood to those skilled in the art. Examples of reactive functionalities include hydroxyl, thiol, amino, and epoxy. Of these, hydroxyl and amino functional compounds are preferred, the former giving rise to urethane linkages, the latter to urea linkages. The isocyanate-reactive compounds are preferably predominately hydroxyl-functional, and are generally referred to as polyols. Preferred polyols are the polyoxyalkylene polyether polyols and the polyester polyols.

Polyester polyols are hydroxyl functional polyesters. The polyesters are prepared by conventional methods, for example by the reaction of a di- or polycarboxylic acid or mixture thereof with a di- or polyhydroxyl compound or mixture thereof. In general, polyester polyols have functionalities between 2 and 3, generally 2, i.e. are preferably difunctional. Such polyesters are prepared by reaction of a dicarboxylic acid, dicarboxylic acid anhydride, dicarboxylic acid halide, or dicarboxylic acid ester with a diol. The diol may be an alkylene diol or aromatic diol.

Preferred diols are ethylene glycol, propylene glycol, 1,2- and hydroquinone, cyclohexanedimethanol, 1,4-butanediol, 1,6-hexanediol, diethylene glycol, triethylene glycol, dipropylene glycol, tripropylene glycol, oligomeric polyethylene glycols, oligomeric polypropylene glycols, and the like.

Preferred dicarboxylic acids and dicarboxylic acid derivatives (acid chlorides, anhydrides, methylesters, etc.) are derived from dicarboxylic acids such as glutaric acid, adipic acid, azelaic acid, maleic acid, fumaric acid, succinic acid, 1,10-decanedioic acid, 1,12-dodecanedioic acid, phthalic acid, terephthalic acid, napthalenedioic acid, and the like. Mixtures of dicarboxylic acids are also useful, particularly mixtures of lower $C_4$–$C_6$ alkylenedicarboxylic acids which may be obtained as a byproduct of adipic acid manufacture. Also suitable are polyethylene terephthalate diols prepared by digesting scrap polyester bottles with glycols.

Most preferred, however, are polyoxyalkylene polyether polyols. Such polyols generally have individual functionalities between about 2 and 8, and are prepared by oxyalkylating an active hydrogen-containing initiator molecule with an alkylene oxide. Suitable alkylene oxides are ethylene oxide (oxirane), propylene oxide (methyloxirane), 1,2- and 2,3-butylene oxide, higher $C_8$–$C_{20}$ alkylene oxides, styrene oxide, oxetane, and tetrahydrofuran. Most preferred are ethylene oxide and propylene oxide and their mixtures.

Polyoxyalkylene polyols are generally prepared by oxyalkylating a suitable initiator molecule in the presence of a strongly basic catalyst, for example an alkali metal hydroxide, an alkali metal alkoxide, or the like, or in the presence of a double metal cyanide catalyst. The alkylene oxide is reacted under modest pressure until the desired molecular weight is reached. Mixtures of alkylene oxides may be used to produce heteric polyoxyalkylene polyethers, while sequential addition of different alkylene oxides may be used to prepare block polyoxyalkylene polyethers. Multi-block, block-heteric, and other variations are useful. Oxyalkylation with ethylene oxide at the end of the reaction results in polyoxyalkylene polyether polyols having a high degree of primary hydroxyl groups, while oxyalkylation with propylene oxide at the end of the reaction results in a high degree of secondary hydroxyl groups. In general, primary hydroxyl groups exhibit higher reactivity with respect to isocyanates than secondary hydroxyl groups.

The initiator molecules must contain one or more, preferably from 2–8 active hydrogen atoms which are suitable for reaction with alkylene oxides. Although a number of active hydrogen-containing functional groups are suitable, most preferred are hydroxyl and amino groups. Suitable hydroxyl-functional initiator molecules are, for example, ethylene glycol, propylene glycol, diethylene glycol, dipropylene glycol, oligo- and polyethylene glycols, oligo- and polypropylene glycols, glycerine, trimethylolethane, trimethylolpropane, neopentylglycol, pentaerythritol, N,N,N',N'-tetrakis(2-hydroxyethyl)ethylenediamine, N,N,N',N'-tetrakis(2-hydroxypropyl)ethylenediamine, sorbitol, sucrose, α-methylglucoside, dihydroxycyclohexane, cyclohexyldimethanol, hydroquinone, resorcinol, and the like. Further suitable are the various methylolated ureas, phenols, resorcinols, melamines, etc, which result from the reaction of formaldehyde with the latter species. Mixtures of initiator molecules may also be used, as well as previously partially oxyalkylated initiator molecules.

Suitable amino functional initiators include the alkyl amines such as methylamine, propylamine, butylamine, triethanolamine, diethanolamine, etc.; the alkylenediamines, for example ethylenediamine, propylenediamine, hexylenediamine; the polyalkylenepolyamines, for example diethylenetriamine, dipropylenetriamine, and the like; aromatic amines and diamines, for example aniline, toluidine, toluenediamine, methylenedianiline, and the like. Mixtures of amino functional initiators may be used, and mixtures of amino functional and hydroxyl and other functional initiators may be used.

The alkylene oxide adducts of phosphorus and polyphosphorus acids are another useful class of polyols. Ethylene oxide, 1,2-epoxypropane, the epoxybutanes, 3-chloro-1,2-epoxypropane, and the like are preferred alkylene oxides. Phosphoric acid, phosphorus acid, the polyphosphoric acids such as tripolyphosphoric acid, the polymetaphosphoric acids, and the like are desirable for use in this connection.

The polyols employed can have hydroxyl numbers which vary over a wide range and are suitable to provide flexible or semi-flexible polyurethane foams from reaction with polyisocyanates. In general, the hydroxyl numbers of the polyols employed in the invention can range from about 20 and lower, to about 150 and higher. The exact polyol employed depends upon the end-use of the polyurethane product to be produced. The molecular weight or the hydroxyl number is selected properly to result in flexible or semi-flexible foams when the polyol is converted to a polyurethane. The polyols preferably possess a hydroxyl number of from about 50 to about 150 for semi-flexible foams and from about 30 to about 70 for flexible foams but can be as low as 20. Such limits are not intended to be restrictive, but are merely illustrative of the large number of possible combinations of the above polyol coreactants.

The most preferred polyols employed in this invention include the polyoxypropylene glycols, triols and higher functionality polyols. These polyols also include polyoxypropylenepolyoxyethylene polyols; however, desirably, the oxyethylene content should comprise less than 80 percent of the total and preferably less than 60 percent. The ethylene oxide when used can be incorporated in any fashion along the polymer chain, for example in internal blocks, as terminal blocks, or it may be randomly distributed along the polymer chain. Most preferably, the ethylene oxide when used is incorporated as a terminal block, i.e. a capped polyol.

Polymer modified polyols can be used and are preferred as a part or all of the polyol requirements of the foamable formulation used in this invention. Polymer modified polyols are well known, the basic patents being the Stamberger patents, U.S. Pat. Nos. 3,304,273; 3,383,351, U.S. Pat. No. Re. 28,715 (reissue of U.S. Pat. No. 3,383,351) and U.S. Pat. No. 3,523,093. Later disclosures of polymer polyols include the Scharf et al. and Kuryla Canadian Patent Nos. 735,010 and 785,835; the Pizzini et al. U.S. Pat. No. 3,823,201; the Ramlow et al. U.S. patent application Ser. No. 431,080, filed Jan. 7, 1974, the Ramlow et al. U.S. Pat. No. 3,953,393; the DeWald U.S. Pat. No. 3,655,553, and the Shah U.S. Pat. No. 4,119,586. These as well as other suitable polymer polyols can be employed herein. The preferred polymer modified polyols are formed by polymerizing one or more polymerizable ethylenically unsaturated monomers, generally in situ in a continuous polymer phase, which is termed the carrier polyol. The proportion of polymer in the polymer modified polyol can range from about 4 to about 60 weight percent, preferably from about 15 to about 35 weight percent, based on the total weight of the polymer modified polyol.

The polymerizable ethylenically unsaturated monomers which can be used making the polymer polyols employed in this invention are the conventional polymerizable vinyl monomers. The monomers can be used singly or in combination to produce homopolymer polyol or copolymer polyol reactive compositions. Examples of suitable monomers are styrene, α-methylstyrene, p-methylstyrene, 2,4-dimethylstyrene, ethylstyrene, isopropylstyrene, butylstyrene, phenylstyrene, cyclohexylstyrene, benzylstyrene, and the like; the acrylic and substituted acrylic monomers such as acrylic acid, methacrylic acid, methyl acrylate, 2-hydroxyethyl acrylate, 2-hydroxyethyl methacrylate, methyl methacrylate, octyl methacrylate, acrylonitrile, methacrylonitrile, 2-ethylhexyl acrylate, phenyl acrylate, phenyl methacrylate, N,N-dimethylacrylamide, and the like; the vinyl esters, vinyl ethers, vinyl ketones, etc. such as vinyl acetate, vinyl butyrate, vinyl acrylate, vinyl methacrylate, N-vinylpyrrolidone, and the like; the vinyl halides and vinylidene halides, such as vinyl chloride, vinyl fluoride and vinylidene chloride and the like; t-butylaminoethyl methacrylate, glycidyl acrylate, allyl alcohol, vinyl pyridine, and the like.

The polymer of the polymer-modified polyol is typically polymerized through the use of conventional vinyl polymerization initiators, for example free radical initiators such as the azoalkylnitriles, organic peroxides, hydroperoxides, peroxyketones, peroxyesters, and the like.

Chain transfer agents are useful in preparing the polymer modified polyols. Any of the known polymerizable monomers can be used and the compounds listed above are illustrative and not restrictive of the monomers suitable for use in this invention. Any of the known chain transfer agents can be present if desired. The preferred monomer used to make the polymer of the preferred polymer polyols is acrylonitrile alone as a homopolymer or in combination with styrene or methyl methacrylate as a copolymer. The relative weight proportions of acrylonitrile to styrene illustratively range from about 20:80 to about 100:0, preferably from about 25:75 to 100:0 and more preferably, when low molecular weight polyols, e.g. below about 2000 are used, then the weight ratio should be from about 60:40 to about 85:15. The polymerization of the ethylenically unsaturated monomers is preferably performed in situ in a polyether or polyester polyol which may be termed the "base" polyol or "carrier" polyol.

The catalysts that are useful in producing molded cellular flexible polyurethane in accordance with this invention include: (a) tertiary amines such as bis(dimethylaminoethyl) ether, trimethylamine, triethylamine, N-methylmorpholine, N-ethylmorpholine, N,N-dimethylbenzylamine, N,N-dimethylethanolamine, N,N,N',N'-tetramethyl-1,3-butanediamine, triethylenediamine, triethanolamine, 1,4-diazabicyclo[2.2.2]octane, pyridine oxide and the like; (b) tertiary phosphines such as trialkylphosphines, dialkylbenzylphosphines, and the like; (c) strong bases such as alkali and alkaline earth metal hydroxides, alkoxides, and phenoxides; (d) acidic metal salts of strong acids such as ferric chloride, stannic chloride, stannous chloride, antimony trichloride, bismuth nitrate and chloride, and the like; (e) chelates of various metals such as those which can be obtained from acetylacetone, benzoylacetone, trifluoroacetylacetone, ethyl acetoacetate, salicyladehyde, cyclopentanone-2-carboxylate, acetylacetoneimine, bis-acetylacetone-alklenediimines, salicyladehydeimine, and the like, with the various metals such as Be, Mg, Zn, Cd, Pb, Ti, Zr, Sn, As, Bi, Cr, Mo, Mn, Fe, Co, Ni, or such ions as $MoO_2^{++}$, $UO_2^{++}$, and the like; (f) alcoholates and phenolates of various metals such as $Ti(OR)_4$, $Sn(OR)_4$, $Sn(OR)_2$, $Al(OR)_3$, and the like, wherein R is alkyl or aryl and the reaction products of alcoholates with carboxylic acids, beta-diketones, and 2-(N-N-dialkylamino)alkanols, such as the well known chelates of titanium; (g) salts of organic acids with a variety of metals such as alkali metals, alkaline earth metals, Al, Sn, Pb, Mn, Co, Ni, and Cu, including, for example, sodium acetate, potassium laurate, calcium hexanoate, stannous acetate, stannous octoate, stannous oleate, lead octoate, metallic driers such as manganese and lead naphthenate, and the like; and (h) organometallic derivatives of tetravalent tin, trivalent and pentavalent As, Sb, and Bi, and metal carbonyls of iron and cobalt.

Among the organotin compounds that deserve particular mention are dialkyltin salts of carboxylic acids, e.g., dibutyltin diacetate, dibutyltin dilaurate, dibutyltin maleate, dilauryltin diacetate, dioctyltin diacetate, dibutyltin-bis(4-methylaminobenzoate), dibutyltin-bis(6-methylaminocaproate), and the like. Similarly, there may be used a trialkyltin hydroxide, dialkyltin oxide, dialkyltin dialkoxide, or dialkyltin dichloride. Examples of these compounds include trimethyltin hydroxide, tributyltin hydroxide, trioctyltin hydroxide, dibutyltin oxide, dioctyltin oxide, dilauryltin oxide, dibutyltin-bis(isopropoxide), dibutyltin-bis(2-dimethylaminopentylate), dibutyltin dichloride, dioctyltin dichloride, and the like.

The tertiary amines may be used as primary catalysts for accelerating the reactive hydrogen/isocyanate reaction or as secondary catalysts in combination with one or more of the above-noted metal catalysts. Metal catalysts, or combinations of metal catalysts, may also be employed as the accelerating agents, without the use of amines. The catalysts are employed in small amounts, for example from about 0.001 percent to about 5 percent of each, based on weight of the reaction mixture.

It is also within the scope of the invention to employ small amounts, e.g. about 0.01 percent to 5.0 percent by weight, based on the total reaction mixture, of a silicone foam stabilizer. Such silicone foam stabilizers are well known to those skilled in the art of polyurethane foams. Useful silicone surfactants include blends of one or more polyols as defined hereinabove with a silicone such as an aryl modified dimethyl silicone oil or a polyphenylethylsiloxane copolymer. Other useful silicone surfactants are the "hydrolyzable" polysiloxane-polyoxyalkylene block copolymers such as the block copolymers described in U.S. Pat. Nos. 2,834,748 and 2,917,480. Another useful class of foam stabilizers are the nonhydrolyzable polysiloxane-polyoxyalkylene block copolymers such as the block copolymers described in U.S. Pat. No. 3,505,377; and British Patent Specification No. 1,220,471. The latter class of copolymers differs from the above-mentioned polysiloxane-poloxyalkylene block copolymers in that the polysiloxane moiety is bonded to polyoxyalkylene moiety through carbon-to-oxygen-to-silicon bonds. These various polysiloxanes-polyoxyalkylene block copolymers preferably contain from 5 to 50 weight percent of polysiloxane polymer with the remainder being polyoxyalkylene polymer. Any other suitable surfactants or stabilizers can be used.

Any compatible pigment can be used in the foamable mixture used in this invention. Carbon black is extensively used as a pigment in polyurethane products. Other useful pigments include Prussian blue, manganese violet, manganese blue, emerald green, cobalt blue, cobalt violet, Mayan blue, iron oxide red, chrome red, vermillion, ultramarine blue, ultramarine violet, phthalocyanine green and brilliant red. The amounts of pigments used are not narrowly critical and depend in large part on the shade of medium to dark color desired. Illustrative ranges are from about 0.1 to about 4 weight percent, preferably about 0.3 to about 2 weight percent of the pigment based on the weight of the polyurethane product. Larger amounts of pigment can be used although difficulties with mixing and handling the larger amounts of pigments can result because of increased viscosity. The pigment can be incorporated into the polyol, the polyisocyanate composition, or both.

A small amount of a polyurethane blowing agent, such as, water is used, in the foamable reaction mixture, for example, from about 0.1 to about 5 weight percent of water, based upon total weight of the polyol composition, or through the use of blowing agents which are vaporized by the exotherm of the reaction, or by a combination of the two methods. Illustrative polyurethane blowing agents include halogenated hydrocarbons such as trichloromonofluoromethane, dichlorodifluoromethane, dichloromonofluoromethane, dichloromethane, trichloromethane, 1,1-dichloro-1-fluoroethane, 1,1,2-trichloro-1,2,2-trifluoroethane, hexafluorocyclobutane, octafluorocyclobutane, and the like. Another class of blowing agents include thermally unstable compounds which liberate gases upon heating, such as N,N'-dimethyl-N,N'-dinitrosoterephthalamide, and the like. Hydrochlorofluorocarbons (HCFCs), hydrofluorocarbons (HFCs) and perfluorocarbons (PFCs) may also be used. Low boiling alkanes and cycloalkanes are also suitable, for example, pentane, hexane, cyclopentane, cyclohexane, and the like. However, water, either as the sole blowing agent, or in combination with a halogenated hydrocarbon or alkane or cycloalkane blowing agent, most preferably one having a low ozone depletion potential (ODP) and low global warming potential (GWP) is preferable. Most preferably, water is the sole blowing agent. The quantity of blowing agent employed will vary with factors such as the density desired in the foamed product.

The organic polyisocyanates that are useful in producing the molded flexible polyurethane cellular products in accordance with this invention are organic compounds that contain at least two isocyanate groups and include the monomeric and polymeric organic polyisocyanates such as prepolymers produced by reacting a polyol with an excess of a polyisocyanate. The quasi-prepolymers such as the reaction products of excess toluene diisocyanate and short chain polyoxypropylene diols or triols, are preferred in those instances where ease of processing such materials is desired. The polyisocyanates are well known in the art. Suitable organic polyisocyanates include the hydrocarbon diisocyanates (e.g., the alkylene diisocyanates and the arylene diisocyanates) as well as known triisocyanates. As examples of suitable polyisocyanates one can mention, 1,2-diisocyanatoethane, 1,3-diisocyanatopropane, 1,2-diisocyanatopropane, 1,4-diisocyanatobutane, 1,5-diisocyanatopentane, 1,6-diisocyanatohexane, bis(3-isocyanatopropyl) ether, bis(3-isocyanatopropyl) sulfide, 1,7-diisocyanatoheptane, 1,5-diisocyanato-2,2-dimethylpentane, 1,6-diisocyanato-3-methoxyhexane, 1,8-diisocyanatooctane, 1,5-diisocyanato-2,2,4-trimethylpentane, 1,9-diisocyanatononane, 1,10-diisocyanatopropyl ether of 1,4-butylene glycol, 1,11-diisocyanatoundecane, 1,12-diisocyanatododecane, bis (isocyanatohexyl) sulfide, 1,4-diisocyanatobenzene, 2,4-diisocyanatotoluene, 2,6-diisocyanatotoluene and mixtures thereof, 1,3-diisocyanato-o-xylene, 1,3-diisocyanato-m-xylene, 1,3-diisocyanato-p-xylene, 2,4-diisocyanato-1-chlorobenzene, 2,4-diisocyanato-1-nitrobenzene, and 2,5-diisocyanato-1-nitrobenzene, 4,4'-diphenylmethylene diisocyanate, 2,2'-diphenylmethane diisocyanate, 3,3'-diphenylmethylene diisocyanate, 2,4'-diphenylmethylene diisocyanate, diphenylmethylene diisocyanates modified with carbodiimides or low molecular weight glycols or polyoxyalkylene diols or triols to liquefy same, and polymethylenepoly(phenyleneisocyanates) having average functionalities of from 1.5 to 5, preferably from 2 to 3, and mixtures thereof. A preferred mixture of polyisocyanates comprises 80 wt. % 2,4-toluenediisocyanate and 20 wt. % 2,6-toluenediisocyanate.

The term "TPR window" as used herein is substantially as described in U.S. Pat. No. 4,579,700, and is by now well known to those skilled in the art. The TPR window is that time during the foaming and curing of a flexible polyurethane foam in a closed mold when the cell walls of the curing polyurethane foam are sufficiently strong to support the shape of the molded foam and avoid collapse when exposed to atmospheric pressure but are weak enough to be burst by the internal pressure of hot expansion gases within the cells, thus opening the cells, upon exposure to atmospheric pressure. This remarkable phenomenon has been found to occur in all moldable, foamable, flexible polyurethane formulations investigated, although it may occur at different periods in the cure for different formulations. The short period of time during which this phenomenon is evident is herein called the TPR window and extends for 25 or 30 seconds, more or less, which is, in general, enough time to expose the molded foam to atmospheric pressure. The exposure of the curing molded foam product to atmospheric pressure during the TPR window results in the bursting or opening of a substantial proportion of the cells (and, in some cases involving relatively thin molded foamed products, all of the cells) which then precludes the need for hurriedly crushing or otherwise opening the cells upon demolding so as to avoid shrinkage.

In the laboratory evaluation of molded foams, it is common to use molds which are clamped together using mechanical clamping force. In the commercial production of polyurethane molded foams, however, several alternative means are utilized to supply the clamping pressure necessary to seal the mold at the parting lines. Hand clamping is still utilized for some parts, especially those of relatively simple configuration, or for production where only a limited production run is contemplated. For more complex parts, and for extended production runs, it is common to use hydraulic or pneumatic clamping means. Pneumatic clamping means include both the use of pneumatic cylinders similar to those utilized in hydraulic systems but with air as the working fluid, or more recently, air bag techniques where the lower surface of the mold is supported and pressurized utilizing an inflatable bladder. In the TPR process as previously practiced, complete release of clamping force, hydraulic pressure, or pneumatic pressure, results in the mold surfaces parting along the part line to such an extent that green polyurethane foam may exude into the cavity between the part lines, thus producing an unacceptable part which, in general, is scrapped. The scrap rate increases dramatically if the pressure release during TPR is close to the beginning of the TPR window, and is further exacerbated in systems having short demold times where the TPR window is relatively narrow.

In the process of the present invention, the clamping pressure utilized to seal the mold against the pressure of the foaming polyurethane system is released only to such an extent as to cause an imperceptible parting of the mold sealing surfaces, by which time, in general, an audible "hiss" of escaping gas may be observed. However, the residual clamping force is such that upon release of the internal pressure and the resultant cell opening caused by this pressure release, the mold sealing surfaces reseal due to the clamping pressure now being higher than the internal pressure of the mold. Due to the fact that the movement between the top and bottom portions of the molding tool is but an imperceptible amount, the resiliency and tensile strength of even a green urethane foam is such that contour lines caused by differential release of the polyurethane system from the mold surfaces is totally or substantially eliminated. Moreover, as the gap in the sealing surfaces is such as to allow gas to escape, but remains quite small, and further in view of the fact that the mold reseals substantially immediately upon release of the internal pressure, the green polyurethane system has neither a well defined space into which to extrude, nor the time to do so. As a result, the "pinch" effect is virtually eliminated.

The initial mold clamping pressure is sufficient to seal the mold against the pressure of the foaming reaction mixture so as to prevent excursion of the curing liquid reactants or partially cured foam into the interstitial space between the mold parting (sealing) surfaces. The pressure should be such that the foam will not "TPR" itself, in other words, should be sufficient that gas escape and cell opening will not occur without purposefully reducing the clamping pressure at the desired time, i.e. during the TPR window.

Figure 1A:
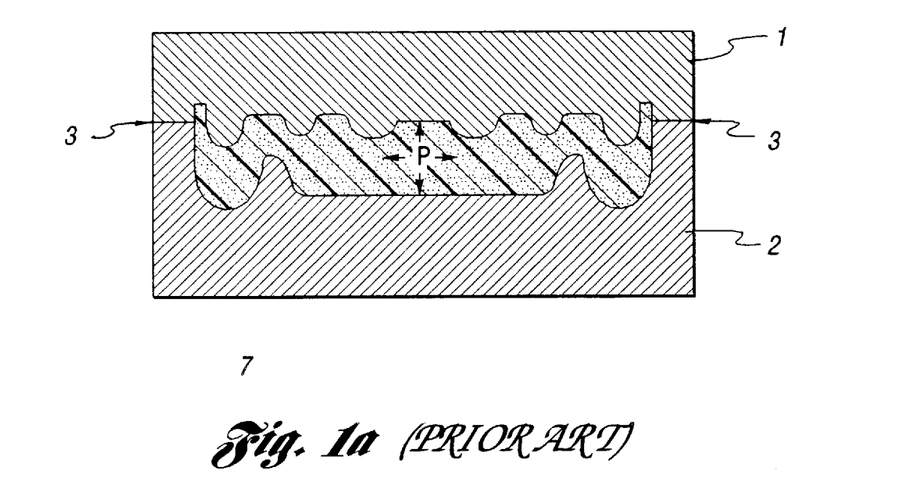
FIG. 1a represents a schematic of a polyurethane molded part being produced in a two-part clamped mold.

FIG. 1a illustrates a polyurethane molding tool in cross-section. The upper portion of the tool is shown at 1, while the lower portion of the tool is shown at 2. At 3 are the seal areas between the top portion of the tool 1 and the bottom portion of the tool 2. At 7 is shown the polyurethane foam having been expanded to completely fill the mold which is now under pressure P due to the gas pressure in the closed cells of the foam. As the mold is closed, the pressure is uniformly exerted in all directions.

Figure 1B:
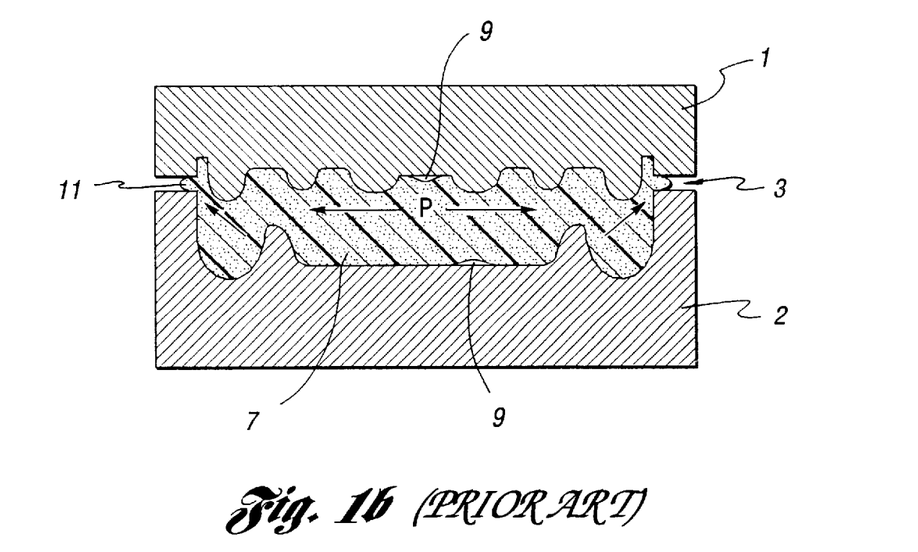
FIG. 1b illustrates the formation of pinch deformation which occurs during the TPR process where the mold surfaces part appreciably at the parting lines, and the formation of contour lines caused by differential adhesion of the molded polyurethane part to the mold surface.

In FIG. 1b, the clamping pressure between the top of the tool 1 and the bottom of the tool 2 has been completely released. The pressure of the green polyurethane foam has caused tool portion 1 and the tool bottom 2 to recede from one another, thus opening the areas along the seal area 3. At 9 are shown areas where the polyurethane foam has parted from the mold surface, while the surrounding polyurethane foam has not. At this point, a contour line will be formed. The pressure exerted by the foam causes the foam to be forced against the low pressure areas at the parted sealing surfaces. At 11 is shown the green polyurethane foam, being only in a partially cured state, and under pressure, exuding from the mold cavity into the area between the sealing surfaces of the two mold portions. This pinch deformation is normally considered a rather severe defect and causes scrapping of the polyurethane part.

Figure 2A:
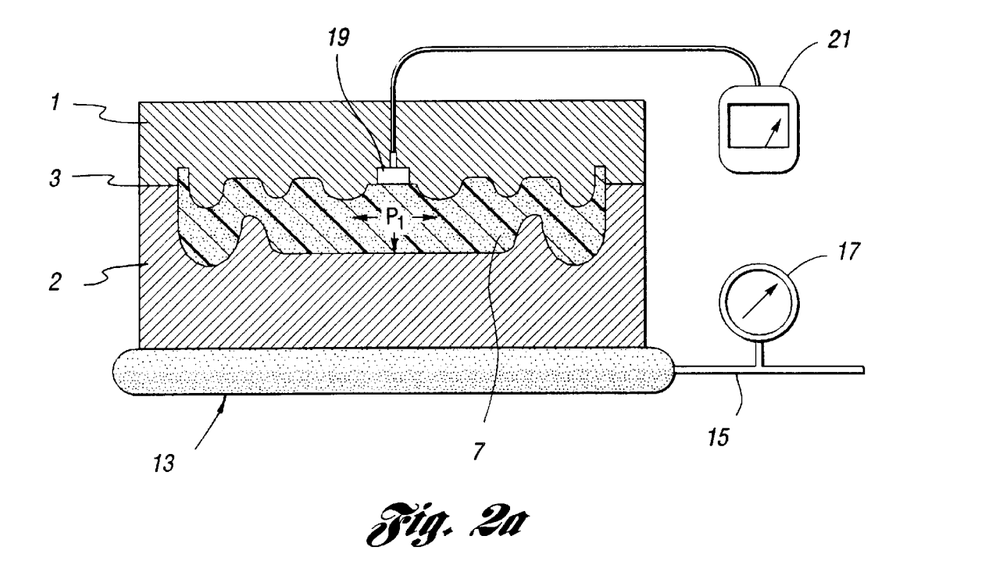
FIG. 2a illustrates schematically the pressure of regulated air and in-mold pressure, respectively, before pressure release using the TPPR process.

In FIG. 2a, the upper and lower parts of the tool, seal areas, and polyurethane foam are designated as in FIGS. 1a and 1b. At 13 is shown an air bag which is inflated by regulated air flowing through line 15 and monitored by pressure gauge 17 to place pressure between the free floating lower surface of the mold and the upper portion of the mold which is fixed in position. At 19 is shown a pressure transducer which monitors the interior pressure of the mold and at 21 is shown a pressure gauge which displays this pressure. In order for the mold to be sealed properly, the pressure P2 exerted by the air bag must be greater than the force exerted against the mold surface by pressure P1, the internal pressure of the polyurethane foam forming ingredients, and by the weight of the bottom portion of the tool. If P2 is not equal or greater than the sum of these pressures, the pressure generated as the polyurethane reactive mixture foams will cause the mold to part along the seal areas and the very fluid foaming mixture will flow past the seal, or the foam may TPR itself, generally resulting in either foam collapse or production of foams with high variation in density and open cell content, and thus commercially unacceptable.

In the conventional TPR process, during the TPR window period, the pressure of regulated air to the air bag is shut off, and the air bag vented to the atmosphere, thus causing the lower portion of the tool to drop under the force of gravity, thus presenting the situation diagrammed in FIG. 1b where the mold parting lines are appreciably separated due to the internal pressure of the polyurethane foam.

Figure 2B:
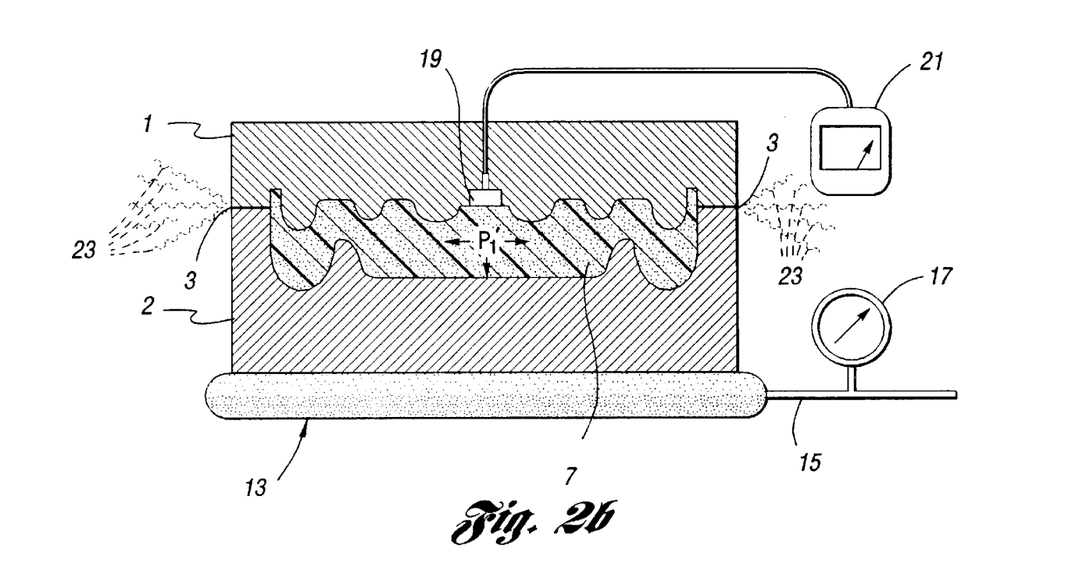
FIG. 2b illustrates the pressure relationships at and after pressure release in the TPPR process.

A TPPR system of the present invention is illustrated in FIG. 2b. In FIG. 2b, the regulated air supply is not shut off, and the venting of the air bag is such as to only lower the pressure to the extent that a virtually imperceptible parting at the seal areas of the mold occurs, at which time the internal pressure is released, cell walls rupture, and gas 23 escapes through the seal area. Although the gap between the upper and lower tools is sufficient to allow for the escape of air, it does not allow for the escape of polyurethane material to any appreciable extent. Moreover, at the point in time where the pressure of the polyurethane foam again approaches atmospheric pressure, the remaining pressure of the air bag, which is maintained greater than the weight of the tool, again seals the tool at the sealing surfaces, thus preventing any egress of the green polyurethane foam.

Following the release of gas from the foam and the cell opening which occurs thereby, the mold, having now resealed, is allowed to remain in the closed position while the foam cures to the extent that it may be handled successfully. The foam is then demolded. If desired, the foam may be further crushed by hand, by roller crushing, or by vacuum crushing following its removal from the mold and prior to any post-cure required. However, this is generally not necessary, as the cell opening effect by the TPPR process is generally sufficient without further crushing, with additional cell opening occurring during the first few times of use.

The initial mold closing pressure is conventional, i.e., an amount which ensures that the mold sealing surfaces will not part due to the pressure generated by the expanding, curing reaction mixture. In a foam part having a top surface measuring 24 by 24 inches (61 cm by 61 cm), for example, the force exerted by an internal pressure of 4 psig is in excess of 2300 pounds. Thus, the initial closing pressure is generally set to a figure which can easily withstand this pressure. As molds are generally quite robust in structure, they can withstand considerable clamping pressure.

The reduced clamping pressure must, in general, be determined for each mold for a given formulation and fill level. In the case of bottom supported tools, for example, the reduced clamping force will be in excess of what is required merely to support the tool. If the clamping force (i.e., air bag pressure, hydraulic pressure, or mechanical pressure) is only such as to support the tool, then the large force generated by the expanding foam will cause more than imperceptible parting of the sealing surfaces. Contour lines are likely to form under these conditions. Moreover, the movement created will not be reversed and the tool will remain in a parted condition, as the clamping pressure is not greater than the tool weight. Under these circumstances, pinch deformation can easily occur, as the still green foam has an appreciable time to escape the mold cavity.

In the case of tools where the bottom is fixed and the top movable, some clamping force is still necessary, due to the fact that even when cell rupture has occurred and gas has escaped, the resulting foam part is not totally open celled, but retains a number of closed cells containing gas under pressure. Moreover, the polyurethane polymer which composes the cell walls, whether open or closed, has a certain natural resiliency. If the sum of the gas pressure and resiliency is only 1 psig, this translates into a force in excess of 570 pounds in the case of the mold previously described. This force is, in many if not most cases, sufficient to support the entire weight of the top portion of the tool. Moreover, this pressure will delay closing and resealing of the mold, thus encouraging pinch formation.

In any case, the reduced clamping force must be sufficient to not allow more than imperceptible movement of the tool along the parting surface of the mold. In a tool with a movable top portion of the size described previously and having a thickness of about 2 cm (0.80 inch), the weight will be approximately 150 lbs. With a foam generating only 4 psig pressure, the unrestrained force acting against the lid is on the order of 2150 lbs., or about half the weight of a large domestic automobile. This enormous force will, if not limited by sufficient reduced clamping force, cause an immediate and large movement of the tool lid. When the reduced clamping force is properly selected, the tool movement is generally imperceptible by the naked eye. Actual movement of from 0.001 to about 0.02 inches (0.0025 cm–0.05 cm) or less is preferred. The reduced clamping force should also be sufficient so that the tool rapidly reseals. If the movement of the mold at the sealing surfaces is substantial, i.e., significantly greater than the imperceptible amount hereinbefore described, the expected benefits of the subject invention in terms of elimination or reduction of contour lines and pinch deformation will not be realized. A reduced clamping force capable of resealing the mold at an internal mold pressure of about 10–20%, preferably 10% of the maximum internal pressure may be provided.

In the case of pneumatically or hydraulically clamped tools, the reduced clamping force may be established by switching the source of fluid supply to one of lower pressure or other equivalent means. In the case of mechanically clamped tools, it is advantageous to supply clamping pressure by lever-actuated cams or eccentrics. The maximum eccentricity of the cam or eccentric should be such so as to provide the necessary closing force prior to TPPR, with a portion of the cam or eccentric having a reduced eccentricity supplying the reduced clamping force. Preferably, the lever arms which rotate the cams or eccentrics into position are provided with a positive detent at the desired reduced clamping force position in order that reproducibility or reduced clamping force may be achieved.

Having generally described this invention, a further understanding can be obtained by reference to certain specific examples which are provided herein for purposes of illustration only and are not intended to be limiting unless otherwise specified.

EXAMPLE 1

A conventional polyurethane foam formulation was used to illustrate the advantages of the invention. The polyol (resin) side of the formulation consisted of 77.1 parts by weight of a polyoxyethylene polyoxypropylene glycerine initiated polyether polyol having a nominal molecular weight of 5000 and hydroxyl number of 34–35, containing 19 weight percent polyoxyethylene moieties as a cap; 22.9 parts by weight of ARCOL E-688, a polymer polyol available from ARCO Chemical Co., having a hydroxyl number of 22 and containing 38% by weight polymerized acrylonitrile and styrene in a base polyol similar to that described immediately above; 4.2 parts by weight water; 0.23 parts by weight of a 33 weight percent solution of triethylenediamine in dipropylene glycol; 0.20 parts by weight of a 70 weight percent solution of bis(2-dimethylaminoethyl)ether in dipropylene glycol; and 1.0 parts by weight of Y-10,515, a silicone polyether copolymer surfactant available from OSi Specialities, Inc. The above components were prepared as a preblend by thorough mixing, and reacted with toluene diisocyanate at 100 index by intensive mixing for approximately five seconds.

A rectangular metal mold measuring 38 by 38 by 12.7 cm was preconditioned by treatment with a wax mold release. The mold closure was fitted with a pressure transducer and a ¹⁄₁₆" (0.16 cm) diameter vent. The bottom of the mold, containing the mold cavity, was positioned below the mold closure and atop an air bag. The air bag was connected to one of two regulated, adjustable, air supplies by means of a two position valve. A pressure of approximately 2 psig is necessary to support the bottom part of the mold against the closure. The mold was heated to 150° F. (66° C.), following which approximately 725 g. of the foamable polyurethane system described previously, having a temperature equal to ambient, 72° F. (22° C.), was poured into the mold, and the mold sealed by pressurizing the air bag to 25 psig. Extrusion of foam through the vent was noted at 40 seconds. At 90 seconds, at which time the internal mold pressure was 4.30 psig, the air bag pressure was switched to a 2 psig supply. Pressure drop in the mold was noted by 130 seconds. The foam was demolded after 2 minutes, and post cured at 250° F. (121° C.) for 30 minutes. A good molded part with no observable shrinkage was obtained.

COMPARATIVE EXAMPLE 1

A polyurethane molded part was prepared as in Example 1, however, the air bag pressure was set at 5 psig, and maintained at that pressure throughout. Extrusion of foam through the vent was noted at 41 seconds. Maximum internal pressure reached was 3.40 psig. The molded foam part exhibited considerable shrinkage. No TPR was observed.

COMPARATIVE EXAMPLE 2

A molded polyurethane part was prepared as in Comparative Example 1, however, the air bag pressure was set at 4 psig. Mold leakage was noted at 75 seconds. A part exhibiting flash was obtained.

COMPARATIVE EXAMPLE 3

A molded part was prepared as in Example 1, however, the air bag pressure was reduced to 5 psig after only fifteen seconds. Internal pressure reached was only 2.30 psig. The molded part exhibited flash.

COMPARATIVE EXAMPLE 4

Comparative Example 2 was repeated, but the air bag pressure was set at 6.5 psig. TPR was noted at 79 seconds. However, the foam part exhibited shrinkage.

EXAMPLE 2

Example 1 was repeated. Foam extruded from the vent at 41 seconds. Internal pressure at 90 seconds was 4.3 psig as before. A good quality molded part exhibiting no shrinkage was obtained.

EXAMPLE 3

Example 1 was repeated, except that a single air supply was used, and the regulator setting reduced to 4.5 psig at 90 seconds, at which time the internal pressure was 4.3 psig. Maximum internal pressure rose to 4.6 psig and then dropped to 1.8 psig after change of the regulator setting. TPR was noted at 90 seconds. A good foam part exhibiting no shrinkage was obtained.

With the mold size and charge used in the foregoing examples, an internal pressure in excess of 4 psig is necessary to ensure complete mold filling at uniform density in complex molds. Comparative Examples 1 and 2 indicate that the minimum pressure required to seal the mold is between 4 and 5 psig. At 4 psig, mold leakage occurred, while at 5 psig, a part without flash or having only little flash could be obtained. However, 5 psig was insufficient to maintain the seal during the foaming process, as indicated by the lower pressure reached in Comparative Example 1, the foam part of which exhibited shrinkage.

In Comparative Example 4, the air bag pressure was increased to 6.5 psig. However, the foam part, while having a good appearance, exhibited shrinkage. Internal mold pressure reached only 3.1 psig. The insufficient mold closing pressure induced premature pressure release.

In Comparative Example 3, the mold clamping pressure was only partially released, but long before the TPR window. A low internal pressure was reached, and the part had considerable flash.

Examples 1, 2 and 3 illustrate the process of the subject invention. In all examples, a sufficient initial closing pressure was utilized such that mold leakage did not occur, and internal pressure was retained up to the TPR window. The internal pressure was such as to result in thorough mold filling with complex molds. During the TPR window, the pressure was then reduced to an amount sufficient to allow the mold to part by an imperceptible amount, but still sufficient to support the weight of the mold. Under these conditions, the internal pressure is released and the cell walls rupture, yielding good quality, shrink free foam parts. Due to the limited actual movement of the mold, flash and pinch formation is eliminated.

The results are summarized in Table 1.

TABLE 1

| Trial | Example 1 | Comparative Example 1 | Comparative Example 2 | Comparative Example 3 | Comparative Example 4 | Example 2 | Example 3 |
|---|---|---|---|---|---|---|---|
| Vent Exit Noted (Sec.) | 40 | 41 | 41 | 41 | 41 | 41 | 41 |
| TPR (Sec.) | 90 | None | 75 | 72 | 79 | 90 | 90 |
| Internal Mold Pressure (psig) | 4.30 | 3.40 | — | 2.30 | 3.10 | 4.30 | 4.30 / 4.6 (max) |
| Air Bag Primary Pressure (psig) | 25 | 5 | — | 25 | — | 25 | 25/4.5 |
| Air Bag Secondary Pressure (psig) | 2 | — | 4 | 5 | 6.5 | 2 | — |
| Time Pressure Changed (Sec.) | 90 | — | — | 15 | — | 90 | 90 |
| Shrinkage | No | Yes | No | No | Yes | No | No |
| Flash | No | No | Yes (tool leaked) | Yes | No | No | No |

Having now fully described the invention, it will be apparent to one of ordinary skill in the art that many changes and modifications can be made thereto without departing from the spirit or scope of the invention as set forth herein.

What is claimed is:

1. A process for the in-mold cell opening of molded polyurethane foams, comprising:

(a) introducing a liquid foamable polyurethane prereaction mixture into a mold having sealing surfaces and adapted to be sealed by application of a first clamping force sufficient to seal the mold along said sealing surfaces, at least a portion of said first clamping force provided by one or more clamping devices selected from the group consisting of mechanical clamps, pneumatic clamps, and hydraulic clamps, such that egress of polyurethane past the sealing surfaces is substantially prevented;

(b) sealing said mold by application of said first clamping force;

(c) permitting said prereaction mixture to react and expand into contact with the internal mold surfaces to form a curing polyurethane cellular product containing pressurized expansion gas(es) contained within the cells of said curing polyurethane cellular product, said curing polyurethane cellular product having a TPR window;

(d) partially reducing said first clamping force to a second, reduced clamping force during the TPR window of said curing polyurethane cellular product such that the internal pressure generated by said curing polyurethane cellular product exceeds the force required to maintain said sealing, breaking said seal, a substantial portion of cell walls of said cells rupture and a portion of said expansion gas(es) escape from said mold, substantial separation of said sealing surfaces of said mold prevented due to application of said second, reduced clamping force;

(e) allowing said curing polyurethane cellular product to cure in said mold until it has developed sufficient strength to be removed from said mold; and (f) removing a cell-opened polyurethane cellular product from said mold.

2. The process of claim 1 wherein said seal is reestablished by said reduced clamping force as the internal pressure in said mold caused by said curing polyurethane cellular product is reduced by the escape of said gas(es).

3. The process of claim 1 wherein said mold is a multi-component mold having at least a top portion fixedly mounted and a bottom portion movable with respect to said top portion, said clamping force exerted by hydraulic or pneumatic clamping means, said reduced clamping force being a value greater than that sufficient to support the weight of said bottom portion of said mold in the absence of internal pressure in said mold.

4. The process of claim 1 wherein said clamping force is supplied by hydraulic or pneumatic means.

5. The process of claim 2 wherein said clamping force is supplied by hydraulic or pneumatic pressure.

6. The process of claim 1 wherein said reduced clamping force is sufficient to cause the mold to reseal when the pressure in the mold is from 10% to 20% of the maximum pressure which would be generated within the mold in the absence of TPR.

7. The process of claim 2 wherein said reduced clamping force is sufficient to cause the mold to reseal when the pressure in the mold is from 10% to 20% of the maximum pressure which would be generated within the mold in the absence of TPR.

8. The process of claim 4 wherein said reduced clamping force is sufficient to cause the mold to reseal when the pressure in the mold is from 10% to 20% of the maximum pressure which would be generated within the mold in the absence of TPR.

9. The process of claim 1 wherein said reduced clamping force allows for parting of the mold surfaces by an amount less than 0.02 inch.

10. The process of claim 2 wherein said reduced clamping force allows for parting of the mold surfaces by an amount less than 0.02 inch.

11. The process of claim 1 wherein said clamping force is provided by a rotatable cam or eccentric having at least one portion of first eccentricity and at least one portion of second eccentricity, wherein said first eccentricity provides said clamping force, and said second eccentricity provides said reduced clamping force.

12. A process for the production of a cell-opened cellular polyurethane molded product with reduced frequency of pinch deformation and/or contour lines, comprising:

(a) selecting a molding tool having at least a first portion and a second portion, said portions enclosing between them a mold cavity and having sealing surfaces between said portions, wherein at least one portion of said first and second portions of said molding tool is movable relative to the other portion, said relative movement capable of sealing or unsealing said parts along the sealing surfaces, said sealing effective to prevent egress of pressurized curing polyurethane from said mold cavity;

(b) providing a clamping means capable of exerting a clamping force effective to seal said molding tool;

(c) introducing into said mold cavity a curable, foamable polyurethane prereaction mixture in an amount which will produce a curing polyurethane cellular product substantially filling said mold cavity and exerting an internal pressure;

(d) sealing said mold by said clamping means;

(e) reducing said clamping force only by an amount effective to cause an audible release of pressurized gas between said sealing surfaces, but not sufficient to allow substantial relative movement between said parts of said molds, wherein said clamping force is provided by a rotatable cam or eccentric having at least one portion of first eccentricity and at least one portion of second eccentricity, wherein said first eccentricity provides said clamping force, and said second eccentricity provides said reduced clamping force.

13. The process of claim 12 wherein said reduced clamping force is at least sufficient to maintain said seal in the absence of significant internal pressure in said mold cavity.

14. The process of claim 12 wherein following escape of gas from said mold cavity between said sealing surfaces, said reduced pressure is sufficient to reseal the mold.

15. A process for the preparation of a cell-opened cellular polyurethane molded foam product with reduced frequency of pinch deformation and/or contour lines, comprising:

(a) selecting a two part molding tool having a mold cavity corresponding to the shape of said cellular polyurethane molded product, said tool having an upper portion and a lower portion, said upper and lower portions having respective sealing surfaces, said upper portion fixed in position, said lower portion movable with respect to said upper portion;

(b) pressurizing a fluid closing means suitable for moving said lower portion of said mold against said upper portion such that sufficient pressure is exerted against said lower portion such that said sealing surfaces sealingly engage to an extent necessary to prevent egress of pressurized curing polyurethane foam between said sealing surfaces;

(c) introducing a curable foamable polyurethane prereaction mixture into said mold cavity and curing to form a pressurized cellular curing polyurethane product having a substantial number of closed cells;

(d) reducing the pressure of said pressurized fluid means to a level greater than that required to support the weight of said lower portion of said tool, but insufficient to maintain a gas-tight seal between said sealing surfaces, wherein said pressure reduction takes place at a time following said introducing of said polyurethane prereaction mixture into said mold when said curing polyurethane foam has cured sufficiently to avoid collapse;

(e) allowing gas to escape from the mold cavity past said sealing surfaces such that a substantial number of closed cells of said curing polyurethane rupture, forming open cells;

(f) curing the curing polyurethane to the extent that it may be removed from the mold; and (g) removing a cell-opened cellular polyurethane molded foam product from said mold.

16. The process of claim 15 wherein said pressurized fluid closing means comprises an air bag located below said lower portion of said mold.

17. The process of claim 15 wherein said pressurized fluid closing means comprises one or more pneumatic cylinders.

18. The process of claim 15 wherein said pressurized fluid closing means comprises one or more hydraulic cylinders.

19. A method of preparing a molded polyurethane cellular product having a substantial amount of open cells, comprising:

(a) selecting a molding tool having a cavity corresponding to the shape of said molded polyurethane cellular product and having sealing surfaces;

(b) introducing into said cavity a curable polyurethane prereaction mixture, said mixture upon reacting to form a predominantly closed celled curing polyurethane having a TPR window and exerting a maximum pressure $P_1$ against said mold during said TPR window;

(c) sealing said mold by application of a sealing force $P_2$ greater than $P_1$ such that leakage of curing polyurethane and/or gas from said mold cavity is substantially prevented;

(d) partially reducing $P_2$ to a reduced sealing force $P_2'$ below $P_1$ during the TPR window such that cell walls of said curing polyurethane product rupture and gas escapes from the mold thus reducing $P_1$ to a reduced pressure $P_1'$ and creating a substantial amount of open cells, wherein $P_2'$ is greater than the reduced pressure $P_1'$, thus resealing said mold; and (e) opening said mold and removing from said mold a molded polyurethane cellular product containing a substantial amount of open cells, wherein at least a portion of said reduced sealing force $P_2'$ is provided by one or more clamping devices and exceeds the force exerted by said molding tool due to the action of gravity on said molding tool.

* * * * *